Nov. 19, 1957 R. J. GARNIK 2,813,545
INLINE CONTROL VALVE
Filed June 17, 1955 2 Sheets-Sheet 1

INVENTOR
ROBERT J. GARNIK

BY

ATTORNEYS

United States Patent Office 2,813,545
Patented Nov. 19, 1957

2,813,545

INLINE CONTROL VALVE

Robert J. Garnik, Milwaukee, Wis., assignor to Galland-Henning Manufacturing Company, Milwaukee, Wis., a corporation Application June 17, 1955, Serial No. 516,179

5 Claims. (Cl. 137—599.2)

This invention appertains to control valves particularly adapted for air or hydraulic use and more particularly to valves of the type adapted to be incorporated directly in a pipe line for governing the flow of fluid to an operating cylinder.

One of the primray objects of my invention is to provide an inline valve of a simple and durable construction, which can be easily and quickly adjusted or set to control the flow of fluid therethrough in one direction and free flow of fluid therethrough in the opposite direction.

Another salient object of my invention is to provide a speed control valve having an internal rotatable control disc operated by a turning movement of an external adjusting sleeve carried by the valve casing, the control disc having an arcuate slot therethrough for movement into and out of registration or partial registration with a passage cavity in the valve casing, the disc also forming a valve seat for a poppet valve utilized to allow flow of fluid in one direction only.

A further important object of my invention is to provide novel means for forming the valve casing in a pair of longitudinally aligned sections, with means for mounting the control disc between said casing sections.

A still further object of my invention is to provide novel means associated with the adjusting sleeve and casing for holding the parts in assembled condition against fluid leakage.

With these and other objects in view, the invention consists in the novel construction, arrangement and formation of parts, as will be hereinafter more specifically described and claimed, and illustrated in the accompanying drawings, in which drawings, Figure 1 is a side elevational view of my improved control valve;

Figure 1:
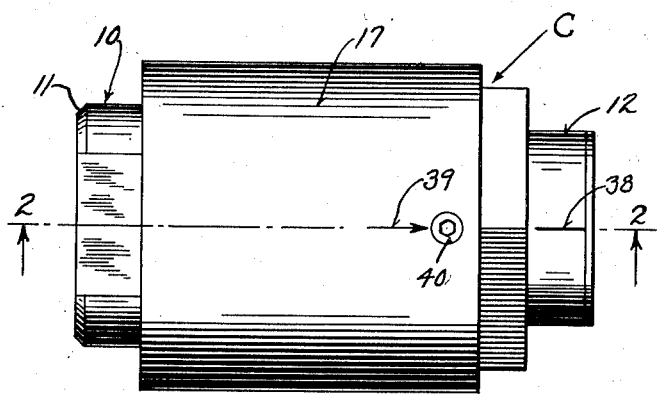
Figure 2:
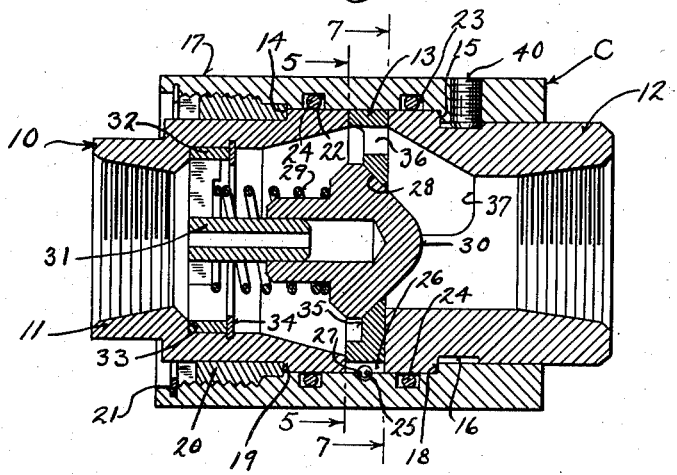
Figure 2 is a longitudinal sectional view through the valve taken on the line 2—2 of Figure 1 looking in the direction of the arrows, the slot in the control disc benig shown in registration with the passage cavity in the valve casing.
Figure 3:
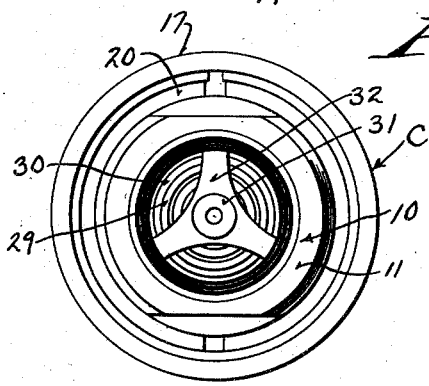
Figure 3 is an end elevational view of the control valve.
Figure 4:
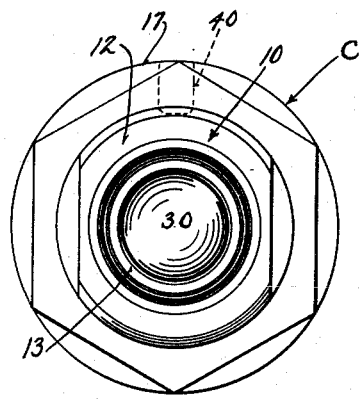
Figure 4 is a view similar to Figure 3 but showing the opposite end of the control valve.
Figure 5:
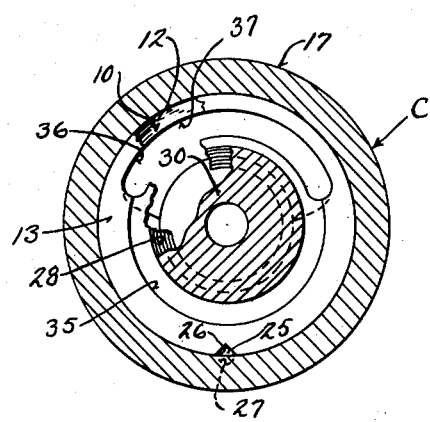
Figure 5 is a transverse sectional view through the control valve taken on the line 5—5 of Figure 2, looking in the direction of the arrows and showing the control slot in the control disc in full registration with the passage cavity in the valve casing.
Figure 6:
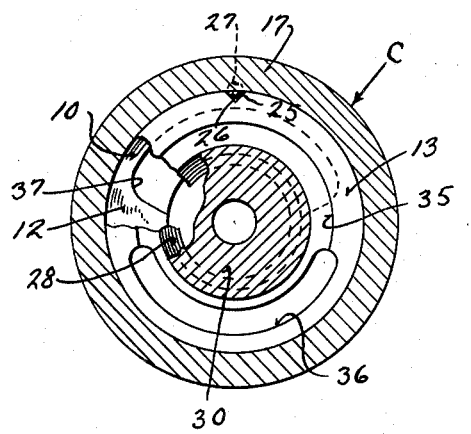
Figure 7:
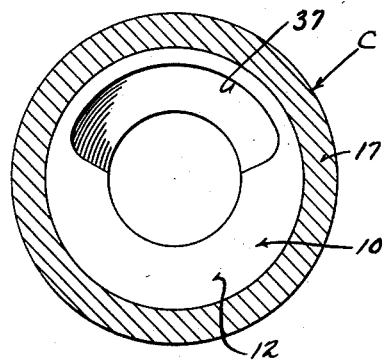

Figure 6 is a sectional view similar to Figure 5, but showing the control disc turned at 180 degrees from that shown in Figure 5, with the control slot in the control disc completely out of registration with the passage cavity in the valve casing, and Figure 7 is a transverse sectional view through the control valve taken on the line 7—7 of Figure 2, looking in the direction of the arrows, the view illustrating more particularly the passage cavity in the valve casing.

Referring to the drawings in detail, wherein similar reference characters designate corresponding parts throughout the several views, the letter C generally indicates my improved control valve and the same includes a valve casing 10 constructed from a pair of independent longitudinally aligned sections 11 and 12. The outer ends of the sections 11 and 12 are internally threaded for the reception of pipe ends or pipe couplings (not shown), and the valve is adapted to be placed directly in a line for controlling the flow of fluid therethrough in one direction. The inner adjacent ends of the casing sections 11 and 12 are preferably ground smooth to form bearing surfaces and to fit snug against the opposite sides of a control disc 13 placed between said sections. The disc 13 is mounted for turning movement relative to the casing sections 11 and 12, as will hereinafter more clearly appear. The inner ends of the casing sections 11 and 12 on opposite sides of the disc 13 are provided with external annular shoulders 14 and 15. The casing section 12 beyond its shoulder 15 is provided with an annular groove 16, the purpose of which will also later appear. Mounted for free turning movement on the casing sections is an adjusting sleeve 17 and this sleeve is also utilized for holding the various parts of the control valve C in an assembled condition. The sleeve 17, adjacent to one end, is provided with an internal annular stop shoulder 18 which is adapted to abut against the shoulder 15 on the casing section 12, when the sleeve is slipped over the casing sections. The sleeve 17 adjacent to its opposite end is provided with a second internal annular stop shoulder 19 and threaded into the sleeve 17 is a gland or retaining sleeve 20. Obviously, by threading the gland or retaining sleeve into the adjusting sleeve 17, the adjusting sleeve can be brought into intimate contact with the shoulder 15 and the gland or adjusting sleeve 20 will make intimate contact with the shoulders 14 and 19. The gland or adjusting sleeve 20 has its outer end slotted so that the same can be turned by a spanner wrench or the like and after the assembling of the various parts, the gland or adjusting sleeve 20 is held in place against turning movement by a split resilient retaining ring 21, which is sprung into a groove formed in the inner face of the adjusting sleeve 17. The adjusting sleeve 17 between the shoulders 18 and 19 and on opposite sides of the control disc 13 is provided with grooves 22 and 23 for the reception of sealing rings 24, preferably of the O-type.

From the construction so far, it can be seen that the parts can be easily and quickly assembled and held in a fluid tight condition. The adjusting sleeve 17 and the control disc 13 are connected together for movement so that upon turning of the adjusting sleeve the control disc will rotate therewith. These two parts can be connected in any preferred way, but I preferably utilize a ball lock 25, adapted to seat in a transversely extending groove 26 formed in the periphery of the control disc and the ball lock also seats in a socket 27 formed in the inner face of the adjusting sleeve 17.

Great stress is laid on the construction and formation of the control disc and the same is provided at its axial center with a valve seat 28 and normally held on this seat by an expansion spring 29 is a poppet valve 30. The poppet valve 30 slides on a hollow guide stem 21 forming a part of a supporting spider 32. The spider is fitted against an annular shoulder 33 in the valve section 11 and is held on the shoulder against movement by a split resilient ring 34 which is sprung into an annular groove formed in the inner face of the casing section 11. Formed in the control disc 13 around the valve seat 28 is an annular groove 35 and opening into this groove is an arcuate slot 36, which extends entirely through the disc. The slot 36 is slightly less than a half circle and the slot forms means for the flow of fluid through the valve casing in one direction. The valve casing section 12 has formed on its inner wall an arcuate passage cavity 37 and by turning the control disc 13 the arcuate slot 36 can be brought into and out of registration with the passage cavity 37. Obviously, by adjusting the slot 36 relative to the cavity 37 the flow of fluid through the valve casing can be accurately set or controlled.

Now referring to Figure 2 of the drawings, it can be seen that fluid flowing through the valve casing in a right hand direction can be accurately set or controlled or shut off by turning the sleeve 17 and that fluid flowing through the valve casing in a reverse direction, namely, toward the left will open the poppet valve 30 and have substantially free unrestricted flow through the valve casing.

From the foregoing description, it can be seen that I have provided an inline valve for effectively controlling the flow of fluid in one direction and the substantially unrestricted flow of fluid in the opposite direction, with the parts of the control valve so made and arranged that the entire valve can be quickly and easily assembled in a fluid tight condition, and one in which adjustment of the control can be quickly and accurately brought about.

It is preferred to mark the valve casing and the sleeve 17 with cooperating indicating lines 38 and 39 and when these lines are in longitudinal alignment, the same will indicate that the valve is open to its fullest extent.

While the adjusting sleeve is firmly held on the valve casing against accidental movement, through its frictional engagement with the valve casing, it may be advisable to lock the adjusting sleeve in a preferred set adjusted position against accidental or unauthorized turning movement. To bring this about a lock screw 40 is provided and the inner end of this screw rides in the annular lock groove 16 and by turning this screw tight into the groove the sleeve can be held against inadvertent, accidental turning movement.

Changes in details may be made without departing from the spirit or the scope of this invention, but what I claim as new is:

1. A valve for controlling the flow of fluid therethrough in one direction and unrestricted flow of fluid therethrough in the opposite direction comprising a casing adapted to be placed in a fluid line, said casing having a passage cavity in its inner wall, a control disc extending across the casing and mounted for turning movement relative thereto having an arcuate slot therethrough adapted to be brought into and out of registration with the cavity, means on the exterior of the casing for turning the control disc, and said control disc having an axially disposed valve seat, and a spring pressed valve in said casing normally urged on said seat.

2. A control valve adapted to be placed in a fluid line comprising a pair of sections arranged in longitudinal alignment and having their outer ends threaded for the reception of pipe ends, the inner wall of one of said sections being provided with an arcuate passage cavity, a control disc disposed between and engaging the adjacent ends of said sections for turning movement having an arcuate slot adapted to be brought into and out of registration with the cavity, an adjusting sleeve rotatable on the casing and covering the control disc, means securing the adjusting sleeve and the control disc together for synchronous movement, one of said sections having an external annular shoulder and said sleeve having an internal shoulder adapted to abut the first-mentioned shoulder, the other of said sections having a similar external shoulder and a packing gland threaded into the sleeve against said last-mentioned shoulder for holding the sleeve, casing sections and control valve in assembled position.

3. A control valve as defined in claim 2, and sealing rings interposed between the casing sections and said adjusting sleeve on opposite sides of the control disc.

4. A control valve as defined in claim 2, and said control disc having an axially disposed valve seat and a spring pressed poppet valve carried by one of said casing sections normally held on the seat.

5. A control valve adapted to be placed in a fluid line comprising a casing including a pair of longitudinally aligned sections, one of said sections having formed on its inner wall and at the inner end thereof an arcuate passage cavity, a control disc mounted between said sections for turning movement and having an arcuate slot adapted to be brought into and out of registration with the cavity, an adjusting sleeve rotatable on the exterior of the casing and connected with said disc, said sleeve extending on opposite sides of said control disc, sealing rings interposed between the adjusting sleeve and the casing sections on opposite sides of the control disc, and means holding the sleeve on said casing against longitudinal movement with the casing sections and control disc assembled.

References Cited in the file of this patent

UNITED STATES PATENTS

| | | |
|---|---|---|
| 323,568 | Doherty | Aug. 4, 1885 |
| 1,580,828 | Harvey | Apr. 13, 1926 |
| 1,759,060 | Moore | May 20, 1930 |
| 2,210,559 | Albright | Aug. 6, 1940 |
| 2,556,583 | Hinz | June 12, 1951 |
| 2,589,188 | Craene | Mar. 11, 1952 |
| 2,685,891 | Segelhorst | Aug. 10, 1954 |
| 2,709,566 | Davis | May 31, 1955 |